United States Patent [19]

Lapointe et al.

[11] Patent Number: 5,056,142
[45] Date of Patent: Oct. 8, 1991

[54] DECRYPTION DEVICE

[76] Inventors: Jacques Lapointe, 53 Place Mercier, #103, Candiac, Quebec, Canada, J5R 4V9; Pierre Cousineau, 237 Hugo Street, St. Eustache, Quebec, Canada, J7T 3Y7

[21] Appl. No.: 443,127

[22] Filed: Nov. 30, 1989

[30] Foreign Application Priority Data

Nov. 30, 1988 [CA] Canada .................................. 584606

[51] Int. Cl.⁵ .............................................. G09C 5/00
[52] U.S. Cl. ........................................ 380/54; 380/56
[58] Field of Search ............... 380/54, 59, 56; 283/17, 283/73–75, 84, 94, 98, 99; 434/364, 354

[56] References Cited

U.S. PATENT DOCUMENTS

| | | | |
|---|---|---|---|
| 1,189,277 | 7/1916 | Martens | 380/59 |
| 1,222,010 | 4/1917 | Mack | 380/56 |
| 1,311,457 | 7/1919 | Nicoletti | 380/56 |
| 1,813,257 | 7/1931 | Rand, Jr. | 283/75 |
| 2,407,067 | 9/1946 | Erminger | 283/17 |
| 2,879,608 | 3/1959 | Watkins | 434/364 X |
| 3,089,260 | 5/1963 | Gray | 434/364 |
| 3,289,320 | 12/1966 | Mair | 380/59 |
| 4,074,445 | 2/1978 | Friedman | 434/354 |
| 4,512,581 | 4/1985 | Levine | 380/54 X |

FOREIGN PATENT DOCUMENTS

| | | | |
|---|---|---|---|
| 0073647 | 3/1983 | European Pat. Off. | 380/54 |
| 1442375 | 5/1966 | France . | |
| 1239027 | 7/1971 | United Kingdom . | |

*Primary Examiner*—Thomas H. Tarcza
*Assistant Examiner*—Tod Swann
*Attorney, Agent, or Firm*—Sim & McBurney

[57] ABSTRACT

A decryption device, comprising a substrate, a plurality of encrypted information symbols located within a rectangular array of further symbols carried by the substrate, wherein the array is arranged in a predetermined number of rows by a further predetermined number of columns. A pair of registration marks are carried by the substrate and located on opposite sides of a predetermined one of the rows. An overlay is adapted for covering the rectangular array, and includes a first pair of apertures arranged to uncover the pair of registration marks, and a plurality of further apertures arranged to uncover the plurality of encrypted information symbols responsive to the first pair of apertures uncovering the pair of registration marks.

13 Claims, 2 Drawing Sheets

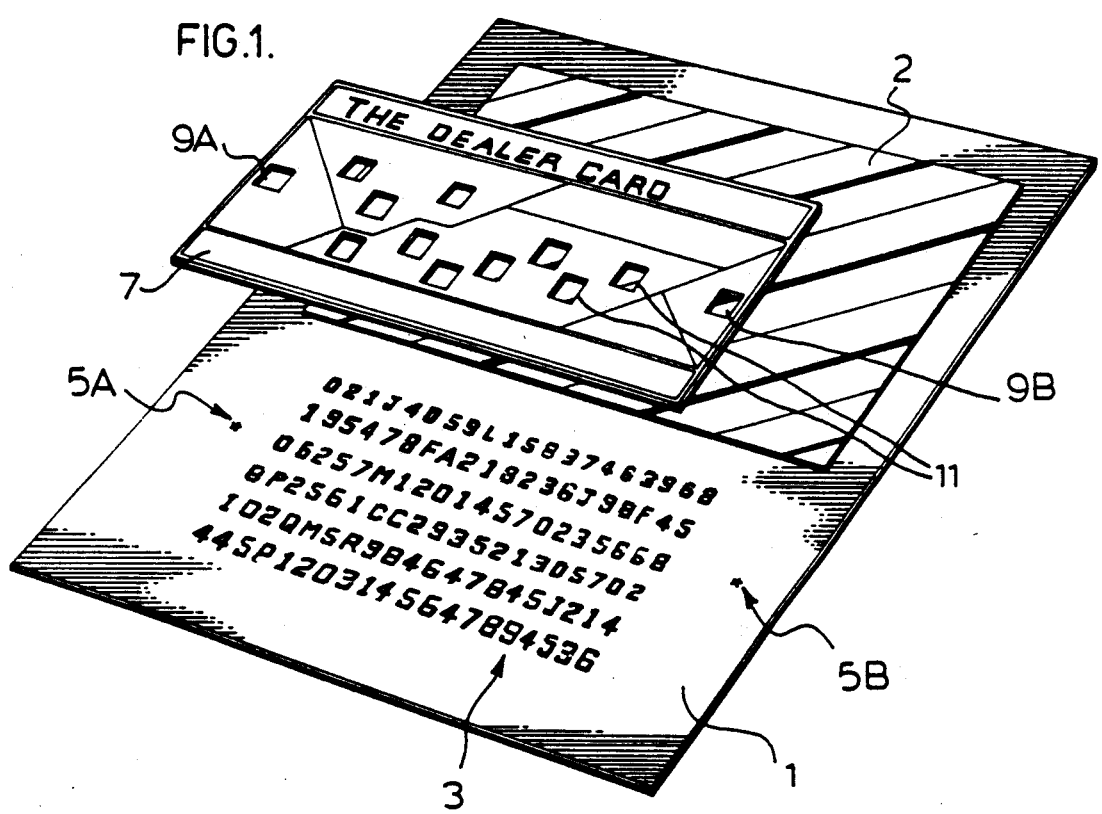
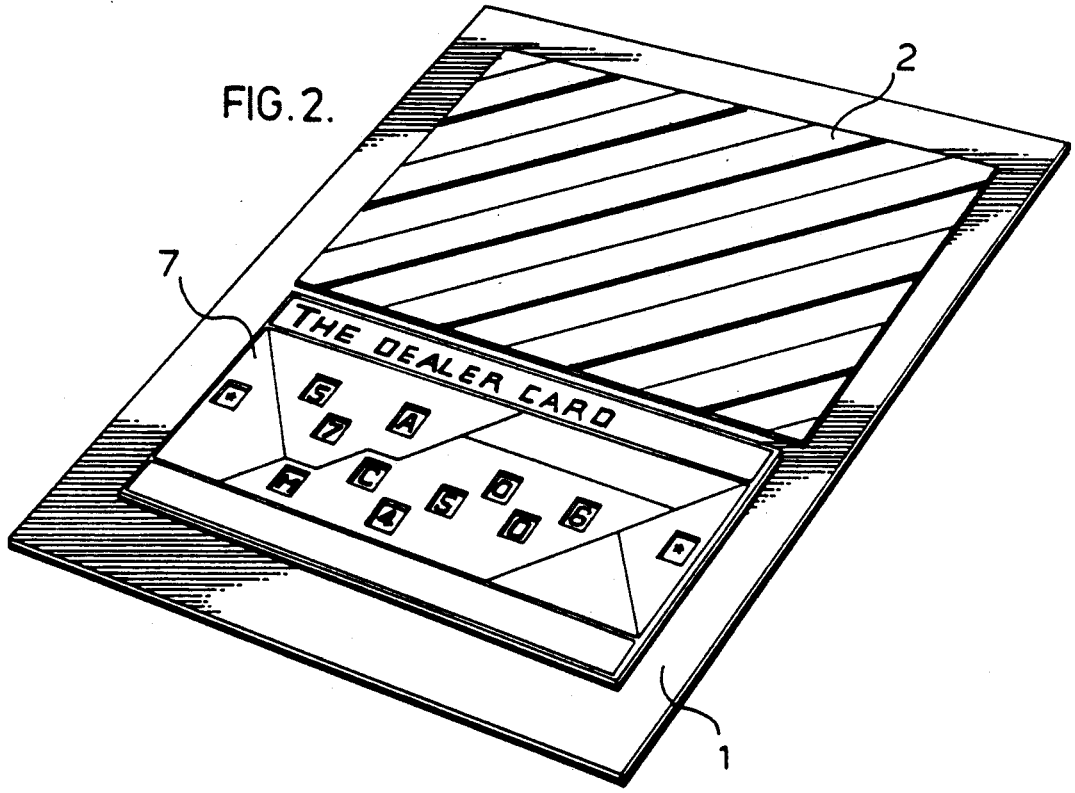

DECRYPTION DEVICE

BACKGROUND OF THE INVENTION

This invention relates in general to coding and decoding of information symbols, and more particularly to a decryption device for decoding predetermined information symbols encrypted within a rectangular array of further symbols.

Present day wallpaper manufacturers publish sample books for illustrating samples of their products to prospective customers. The sample books include actual samples of wallpaper patterns and some photographs of room settings.

These books are sold by the manufacturer to authorized distributors who cover a predetermined territory. The distributor in turn sells the books to retailers. Those retailers generally carry a vast library of these books.

Each page of a sample book includes a number to which a customer may refer for identifying a particular pattern. Upon identifying the model number, the customer orders the wallpaper from the retailer who in turn orders it from the distributor.

In recent years, a number of discount operations have been established throughout North America for legitimately purchasing large quantities of wallpaper for sale to consumers and ignoring authorized distribution channels.

These discount operations do not normally carry copies of the sample books. Thus, in order for a customer to order from one of these discount operations, the customer must enter the business premises of an authorized dealer in order to identify a book and a pattern, and then record the pattern number from that sample book.

The customer then furnishes the discount warehouse with the book name and the pattern number for identifying the desired wallpaper design in order that the discount operation may supply the desired wallpaper directly to the customer at a discount price substantially less than the prices charged by the retailer.

Wallpaper retailers have suffered financial losses as a result of the activities of such discount operations, particularly in view of the fact that manufacturers, distributors and retailers invest substantial sums into design and development of new patterns and new sample books.

None of these costs are incurred by the discount operations who therefore merely reap profits at the expense of losses incurred by the retailers.

According to the present invention, a decryption system has been developed in which each page of a wallpaper sample book contains an array of symbols (long code) in which the valid pattern number (short code) and page number is embedded or encrypted. Each retailer who purchased the sample book is also provided with a card overlay for decoding the embedded or encrypted page and pattern number.

Thus, in operation, a client is prevented from quickly ascertaining the pattern number from the sample book. The client though, is informed of the price of the product, by a price code printed on each sheet which refers to a price index on the inside of the front or back cover.

In order for the customer to place an order for the wallpaper product, he or she must indicate to the dealer which wallpaper sample he or she wishes to buy.

The dealer then decodes the pattern number from the corresponding page of the sample book by using the overlay card.

Since the overlay card and the sample book are property of the dealer, and cannot be obtained by the discount operations unless they buy the book, the customer is prevented from circumventing the authorized channels of sale for the product, thus enabling the dealer to recoup his investment in the sample books.

Prior art decryption systems have been developed for use as educational aids, toys, marking guides, etc., but have not been hitherto used in connection with the problem of preventing sales of merchandise outside of authorized distribution channels.

U.S. Pat. No. 1,311,457 (Nicoletti) discloses cipher apparatus comprising a frame having a fixed reference means thereon; and a plurality of parallel bars slidably mounted in the frame for displacement individually with relation to the reference means. All of the different bars bear an equal number of figures so as to furnish for each position of the bars determined in accordance with a selected numerical key a ciphering table which forms a guide for the breaking up of the message into definite groups of letters.

The Nicoletti system suffers from the disadvantage of acquiring re-alignment of each line of numbers in order to read an encrypted or ciphered code.

U.S. Pat. No. 4,074,445 (Friedman) discloses a method and apparatus for constructing and grading objective examinations comprising a template which is placed on an answer sheet, the template having pre-punched holes which yield a plurality of answer patterns depending on the template orientation.

U.S. Pat. No. 1,222,010 (Mack) discloses a cryptographic cheque system comprising a plurality of cheques of a form to be used in a pack, each cheque having edge tabs, the location of each tab upon its edge representing a certain numerical value, there being not more than one tab upon each edge, the tabs of different cheques being differently located upon the respective edges thereof. The tabs of the different cheques denote different numerical values distinguishing the various individual accounts represented by the cheques from each other.

Thus, each of the Mack and Friedman patents show special indentations or protrusions which are used to orient a coded card.

French Patent 1,442,375 (Pacotto) discloses a game comprising a substrate carrying a plurality of letters arranged in a square array, and a template having a plurality of apertures disposed therein, designed for overlaying the substrate such that predetermined letters of the array appear through the apertures to form word messages. The template or overlay of Pacotto must be aligned with its edges along corresponding edges of the substrate in order for the proper letters to appear in the apertures.

U.K. Patent GB 1,239,027 (Masters) discloses a coding and decoding system comprising a sheet of thin card provided with a plurality of randomly assorted apertures arranged in rows. The card is placed over a sheet of paper and the messages written on the paper using only those parts exposed through the apertures in the card, one character being placed in each of the apertures. The card is then removed and the gaps in the rows of characters which have been written are filled in with randomly chosen characters, either one or two between each letter or pair of characters in the message according to the width of the gaps. The resulting rows of characters on the paper will form gibberish, the intelligibility of the message being entirely masked by the presence of the random characters. In order to read the message, the card must be replaced in the same orientation over the message, whereupon only the characters forming the message are visible through the apertures.

Masters discloses use of an identifying mark for identifying each orientation placed at suitable points on the card (i.e. in respective four corners of the card).

Additional prior art U.S. patents have issued relating to the general problem of message coding and decoding. Examples of such prior art patents are as follows:
U.S. Pat. No. 4,512,581 (Levine),
U.S. Pat. No. 1,813,257 (Rand),
U.S. Pat. No. 2,879,608 (Watkins), and
U.S. Pat. No. 3,089,260 (Gray).

All of the above discussed patents suffer from the disadvantage that, for a given array or collection of encrypted symbols, only a singular decoded message can be obtained therefrom. This results from the fact that according to the prior art patents, the aperture overlay is required to be aligned with either corresponding edges of the underlying substrate or carrier on which the message symbols are disposed, or aligned with predetermined registration or identification marks located on an outer perimeter such as a corner of the carrier, thereby limiting placement of the overlay card to a singular orientation relative to the carrier.

SUMMARY OF THE INVENTION

According to the present invention, a decryption device is provided wherein registration marks may be located on opposite sides of a plurality of rows of a rectangular message symbol array. An overlay card is provided having a first pair of apertures located approximately equidistant from bottom and top edges of the card and adjacent to opposite side edges of the card, the apertures being adapted to uncover the registration marks, and a plurality of additional apertures arranged in various locations between the first mentioned pair of apertures. The dimensions of the card are sufficient to cover or overlay all rows of the message symbol array.

Moreover, according to the present invention, the registration marks are positioned on opposite sides of a predetermined one of the plurality of rows of the array, at a predetermined spacing (i.e. a multiple of column spacings) to the left and right of the array, with the result that a plurality of encrypted message symbols may be located within a single array and may be decoded using a single overlay card, by merely changing the row and column location of the registration marks.

Thus, in the event that a consumer is able to decipher the pattern of location of the order code (i.e. information symbols) in terms of numbers of rows and columns from a predetermined reference symbol within the array (e.g. the top left symbol), the consumer is prevented from deciphering the information symbols from further arrays as a result of re-orienting the registration marks to different rows and columns relative to the array.

In general, according to an aspect of the present invention, there is provided a decryption device, comprising:
a) a substrate carrying a representation of an article of merchandise;
b) a plurality of encrypted information symbols for identifying said article of merchandise and located within an array of further symbols carried by said substrate, said array being arranged in a plurality of rows by a further plurality of columns;
c) a pair of registration marks carried by said substrate and located at a predetermined orientation with respect to said array, said predetermined orientation being adjustable to within a predetermined number of said rows and columns; and
d) overlay means adapted for covering said rectangular array, said overlay means including a first pair of apertures arranged to uncover said pair of registration marks, and a plurality of further apertures arranged to uncover said encrypted information symbols responsive to said first pair of apertures uncovering said pair of registration marks, thereby identifying said article of merchandise.

In accordance with a further aspect of the present invention, there is provided a method of encrypting and decrypting information symbols, comprising the steps of:
a) arranging a plurality of information symbols within an array of further symbols, whereby said information signals are encrypted;
b) locating a pair of registration marks on opposite sides of said array and at a predetermined orientation with respect to said array, said predetermined orientation being adjustable to within a predetermined number of rows and columns of said array;
c) covering said array with an overlay means, said overlay means including a first pair of spaced apart apertures adapted for uncovering said pair of registration marks, and a further plurality of apertures disposed between said first pair of apertures and adapted for uncovering said plurality of information symbols; and
d) positioning said overlay means such that said first pair of apertures uncovers said registration marks, whereby said further plurality of apertures uncover and thereby decrypt said plurality of information symbols.

BRIEF DESCRIPTION OF THE DRAWINGS

A preferred embodiment of the present invention will be described in greater detail below with reference to the following drawings, in which:

FIG. 1 is a perspective view of the decoding overlay card separate from a rectangular array of symbols supported by the substrate carrier according to the present invention;

FIG. 2 is a perspective view of the decoding overlay card positioned over the symbol array of the substrate carrier for revealing a decoded message symbol; and FIGS. 3A–3D illustrate additional embodiments of the rectangular array according to the present invention.

DESCRIPTION OF THE PREFERRED EMBODIMENT

Turning to FIG. 1, a decryption device is shown comprising a substrate 1 which, according to the preferred embodiment, is in the form of a page from a wallpaper sample book. The sample page or substrate 1 preferably includes a sample 2 of a wallpaper design or other article of merchandise to be ordered from the sample book. A rectangular array of symbols 3 (e.g. a number and letter array) is carried by the substrate 1 for embedding or encrypting a predetermined order number for identifying the particular sample 2.

A pair of registration marks 5A and 5B are shown according to one embodiment in the form of asterisks disposed on opposite sides of the third row from the top of the number array 3. The registration mark 5B is spaced one column to the right of the array 3 while the other mark 5A is spaced four columns to the left of the array. However, in accordance with the principle of the present invention, the marks 5A and 5B may be located on opposite sides of any of the second, third or fourth rows of the array 3 at a spacing of from two to four columns from the left or right sides of the array, at least a one column-width space being provided on either side of the array to further complicate manual deciphering of the array.

An overlay card 7 is also provided, the dimensions of the card being sufficient to cover the number array 3. Thus, in accordance with the embodiment shown, the array 3 comprises six rows of symbols and the card 7 has apertures disposed in four rows, and is of sufficient dimensions from the top to bottom edge to cover the entire array when aligned with the registration marks 5A, 5B irrespective of location of the marks 5A and 5B within the defined adjustable orientation of three rows and three columns relative to the array 3.

A first pair of apertures 9A and 9B extend through the card 7 adjacent opposite sides thereof. An additional plurality of apertures 11 extend through the card 7 and are located between the outermost apertures 9A and 9B.

In operation, turning to FIG. 2, the card 7 is placed over the number array 3 on substrate 1 such that registration marks 5A and 5B are exposed through apertures 9A and 9B. Responsive to the first pair of apertures 9A and 9B uncovering the pair of registration marks 5A and 5B, the further apertures 11 uncover predetermined encrypted information symbols of the number array 3, designating the predetermined sample or product number for identifying the sample 2. For the example shown, the decrypted information symbols indicate that the sample pattern 2 is identified by page 15A, pattern No. CCL2155.

According to an aspect of the present invention, the registration marks 5A and 5B can be located on opposite sides of any of a further plurality of rows of the array 3 (e.g. the second, third or fourth row) at a predetermined spacing to the right or left of the array (e.g. from two to four columns from the left or right side), such that the same overlay card 7 can be used to decode an entirely different information symbol pattern relative to the array.

For example, in the event that a consumer breaks the code shown in the drawings with reference to the array itself (i.e. discovering that the code may be deciphered by counting down two rows in the left-most column to yield a "1", skipping one column and then counting down three rows in the third column to yield a "5", etc.), by re-orienting the position of the registration marks to different rows and column locations (i.e. movement in an XY plane), the consumer is prevented from deciphering further codes since the deciphered coding is always relative to the location of the registration marks 5A and 5B, and not to the array itself.

Other embodiments and variations of the present invention are contemplated. For example, the array 3 may include a variety of numbers, letters and spaces for identifying merchandise of any sort (e.g. sports equipment, clothing, etc. from a catalogue). Examples of additional such arrays are illustrated with reference to FIGS. 3A-3D showing various alternative locations of the registration marks 5A and 5B. Furthermore, the overlay card 7 may include fewer or greater number of apertures 11 disposed in virtually any configuration between the outermost apertures 9A and 9B, provided that the dimensions of the card 7 are sufficient for completely covering all rows of the array. In addition, it is contemplated that the registration marks 5A and 5B may be located above and below a predetermined column of the array 3 instead of on opposite sides of a predetermined row, suitable modification being made to the location of apertures 9A and 9B of the card 7.

All such embodiments or modifications are believed to be within the sphere and scope of the present invention as defined by the claims appended hereto.

We claim:

1. A decryption device, comprising:
   a) a substrate carrying a representation of an article of merchandise;
   b) a plurality of encrypted information symbols for identifying said article of merchandise which are located within an array of further symbols carried by said substrate, said array being arranged in a plurality of rows by a further plurality of columns;
   c) a pair of registration marks carried by said substrate and located at a predetermined orientation with respect to said array, said predetermined orientation being selectable to within a predetermined number of said rows and columns of said array; and
   d) overlay means adapted for covering said rectangular array, said overlay means including a first pair of apertures arranged to uncover said pair of registration marks, and a plurality of further apertures arranged to uncover said encrypted information symbols responsive to said first pair of apertures uncovering said pair of registration marks, thereby identifying said article of merchandise.

2. A decryption device as defined by claim 1, said plurality of rows of said array being M in number, said further plurality of columns of said array being N in number, and wherein said predetermined orientation of said pair of registration marks is selectable to within $M-3$ of said rows and $N-3$ of said columns.

3. A decryption device as defined in claim 2, wherein said plurality of further apertures are arranged in a further predetermined number of rows, said further predetermined number of rows being $M-2$ in number.

4. A decryption device as defined in claim 1, wherein said substrate comprises a page from a sample book, said page carrying a representation of a sample of wallpaper.

5. A decryption device as defined in claim 1, wherein said substrate comprises a page from a book of wallpaper patterns, said page carrying a representation of a predetermined wallpaper pattern, and said plurality of encrypted information symbols comprises an order number for identifying said page and said predetermined wallpaper pattern.

6. A decryption device as defined in claim 1, wherein said overlay means comprises a generally rectangular card having plurality of small rectangular apertures extending therethrough.

7. A decryption device as defined in claim 1, wherein each of said plurality of encrypted information symbols and said further symbols are a combination of numbers from 0 to 9, letters A to Z, and spaces.

8. A decryption device as defined in claim 1, wherein said plurality of rows is six, said further plurality of columns is twenty, said plurality of apertures are arranged in four rows, and said predetermined orientation of said pair of registration marks is adjustable to within three rows and three columns.

9. A decryption device as defined in claim 1, wherein said overlay means comprises a generally rectangular card having twelve apertures, at least two of said twelve apertures being located in the same row for uncovering said pair of registration marks.

10. A decryption device as defined in claim 1, wherein said registration marks are asterisks.

11. A decryption device as defined in claim 1, wherein said pair of registration marks are located at least one column space from opposite sides of said array.

12. A method of encrypting and decrypting information symbols, comprising the steps of:
   a) arranging a plurality of information symbols within an array of further symbols, whereby said information signals are encrypted;
   b) locating a pair of registration marks on opposite sides of said array, and at a predetermined orientation with respect to said array, said predetermined orientation being selectable to within a predetermined number of rows and columns of said array;
   c) covering said array with an overlay means, said overlay means including a first pair of spaced apart apertures adapted for uncovering said pair of registration marks, and a further plurality of apertures disposed between said first pair of apertures and adapted for uncovering said plurality of information symbols; and
   d) positioning said overlay means such that said first pair of apertures uncovers said registration marks, whereby said further plurality of apertures uncover and thereby decrypt said plurality of information symbols.

13. A decryption device, comprising:
   a) a substrate carrying a representation of an article of merchandise;
   b) a plurality of encrypted information symbols for identifying said article of merchandise which are located within an array of further symbols carried by said substrate, said array being arranged in a plurality of rows by a further plurality of columns;
   c) a pair of registration marks carried by said substrate and located at a predetermined orientation with respect to said array, said predetermined orientation being selectable to within a predetermined number of said rows and columns of said array; and
   d) overlay means adapted for covering said rectangular array, said overlay means including a first pair of apertures arranged to uncover said pair of registration marks, and a plurality of further apertures arranged to uncover said encrypted information symbols responsive to said first pair of apertures uncovering said pair of registration marks, thereby identifying said article of merchandise,
said plurality of rows of said array being M in number, said further plurality of columns of said array being N in number, and wherein said predetermined orientation of said pair of registration marks is selectable to within M−3 of said rows and N−3 of said columns, and wherein said plurality of further apertures are arranged in a further predetermined number of rows, said further predetermined number of rows being M−2 in number.

* * * * *